United States Patent [19]

Easter et al.

[11] Patent Number: 4,504,896
[45] Date of Patent: Mar. 12, 1985

[54] SWITCHING DC-TO-DC CONVERTERS

[75] Inventors: Finis C. Easter, Indianapolis, Ind.; Ramon H. Aires, Granada Hills, Calif.

[73] Assignee: RCA Corporation, New York, N.Y.

[21] Appl. No.: 451,430

[22] Filed: Dec. 20, 1982

Related U.S. Application Data

[63] Continuation of Ser. No. 245,104, Mar. 18, 1981, abandoned.

[51] Int. Cl.³ .............................................. H02P 13/22
[52] U.S. Cl. ...................................... 363/21; 323/222
[58] Field of Search ...................... 323/222; 363/20, 21

[56] References Cited

U.S. PATENT DOCUMENTS

| | | | |
|---|---|---|---|
| 3,434,030 | 3/1969 | Bedford | 363/20 |
| 3,740,639 | 6/1973 | Easter . | |
| 4,017,784 | 4/1977 | Simmons et al. | 363/17 |
| 4,122,514 | 10/1978 | Amin | 363/21 |
| 4,217,632 | 8/1980 | Bardos et al. | 363/26 |
| 4,253,137 | 2/1981 | Rao | 363/21 |
| 4,300,191 | 11/1981 | Baranowski | 363/21 |

FOREIGN PATENT DOCUMENTS

| | | | |
|---|---|---|---|
| 2809139 | 9/1978 | Fed. Rep. of Germany | 363/21 |
| 43524 | 4/1979 | Japan | 363/21 |
| 77373 | 6/1980 | Japan | 363/20 |
| 404069 | 3/1974 | U.S.S.R. | 363/21 |
| 677051 | 8/1979 | U.S.S.R. | 323/222 |
| 750676 | 7/1980 | U.S.S.R. | 363/20 |

OTHER PUBLICATIONS

Conference Paper, "Switchmode Converter Topologies-Make Them Work for You", by Rudy Severns, (Intersil), pp. 1, 26, 28 & 32, Jun. 1980.

Primary Examiner—William H. Beha, Jr.
Attorney, Agent, or Firm—Joseph S. Tripoli; George E. Haas; Allen LeRoy Limberg

[57] ABSTRACT

In a switching dc-to-dc converter an output current substantially free of pulsations is provided by summing a flyback current and transformed current response to the current used to build up the electromagnetic field that stores the energy for flyback.

12 Claims, 14 Drawing Figures

SWITCHING DC-TO-DC CONVERTERS

This is a continuation of application Ser. No. 245,104, filed Mar. 18, 1981, now abandoned.

The present invention relates to switching dc-to-dc converters and to switching voltage regulators.

The class of switching dc-to-dc converter which relies on the storage of energy in an inductor and the rectification of flyback current as the stored energy is released, is the class of converter with which the present invention is concerned. The energy is stored in the electromagnetic field surrounding the winding of the inductor responsive to pulses of unidirectional current applied to the winding, and to accommodate the storage of energy in this way the magnetic structure associated with the winding must permit the electromagnetic field flux to increase with increasing unidirectional current flow through the winding. A plural winding transformer which can store energy in the electromagnetic field surrounding its windings will be described in this specification and the appended claims as a "flyback transformer".

These magnetic structures contrast with those used in the class of switching dc-to-dc converter including a pair of switching devices for driving the primary winding of a transformer in push-pull to cause an alternating current to flow therein without incurring an accompanying direct current flow, and further including current rectifier means for converting the a-c induced in the secondary to a direct output voltage. In this latter class of converter no storage of energy in the transformer is required. Normally the magnetic structure is made from high-permeability magnetic material with small cross-section and with a closed-loop magnetic path having no air gap, and magnetic saturation of the magnetic structure would occur at levels of direct current flow in an associated winding that would be too small for much energy storage to take place.

In working with the earlier-described class of switching dc-to-dc converter, wherein one relies on the storage of energy in an inductor, the designer encounters two problems. The first, obvious from comparison of the two types of switching converter, is an increased size and weight of the magnetic structure needed for storing energy, which size and weight increase as the amount of energy to be converted increases. The second problem is that output current is pulsating in prior art designs, which tends to increase the output voltage ripple of the converter. Nonetheless, this class of converter that relies on the storage of energy in an inductor is attractive to use because of its simplicity and relative efficiency if regulation is required.

The present invention concerns switching dc-to-dc converters in which the two problems referred to above are substantially less severe than in commonly used prior art designs. The problem of magnetic structure size and weight is reduced by using energy storage in an inductive winding, which is a winding of a flyback transformer, with subsequent rectification of flyback current as the energy is released, as only a first component of the dc-to-dc converter output current. A second component of the dc-to-dc converter output current is obtained by transforming the current applied to the primary winding of the flyback transformer to build up an electromagnetic field to store energy. Such transformation converts a portion of the primary energy without need for storage, so the magnetic structure size and weight can be reduced for a given amount of energy being converted. It also solves the problem of providing a continuing source of output current during the time flyback current is unavailable. The directly transformed and flyback currents are summed to obtain an output current for application to a load.

Figure 8:
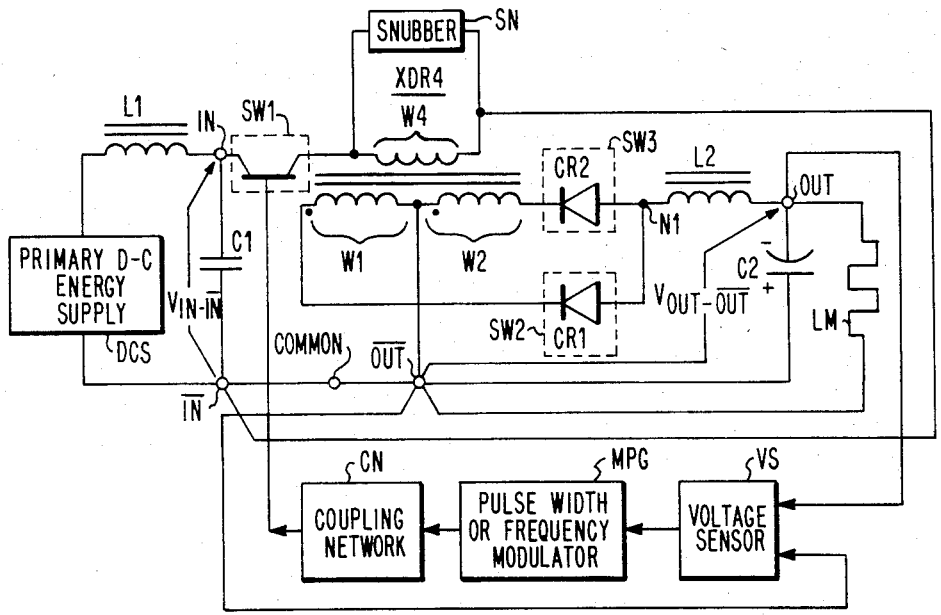
FIGS. 8, 9 and 10 are schematic diagrams of switching converters embodying another related invention, which use transformers as will allow the isolation of converter output voltage from converter input voltage.
Figure 9:
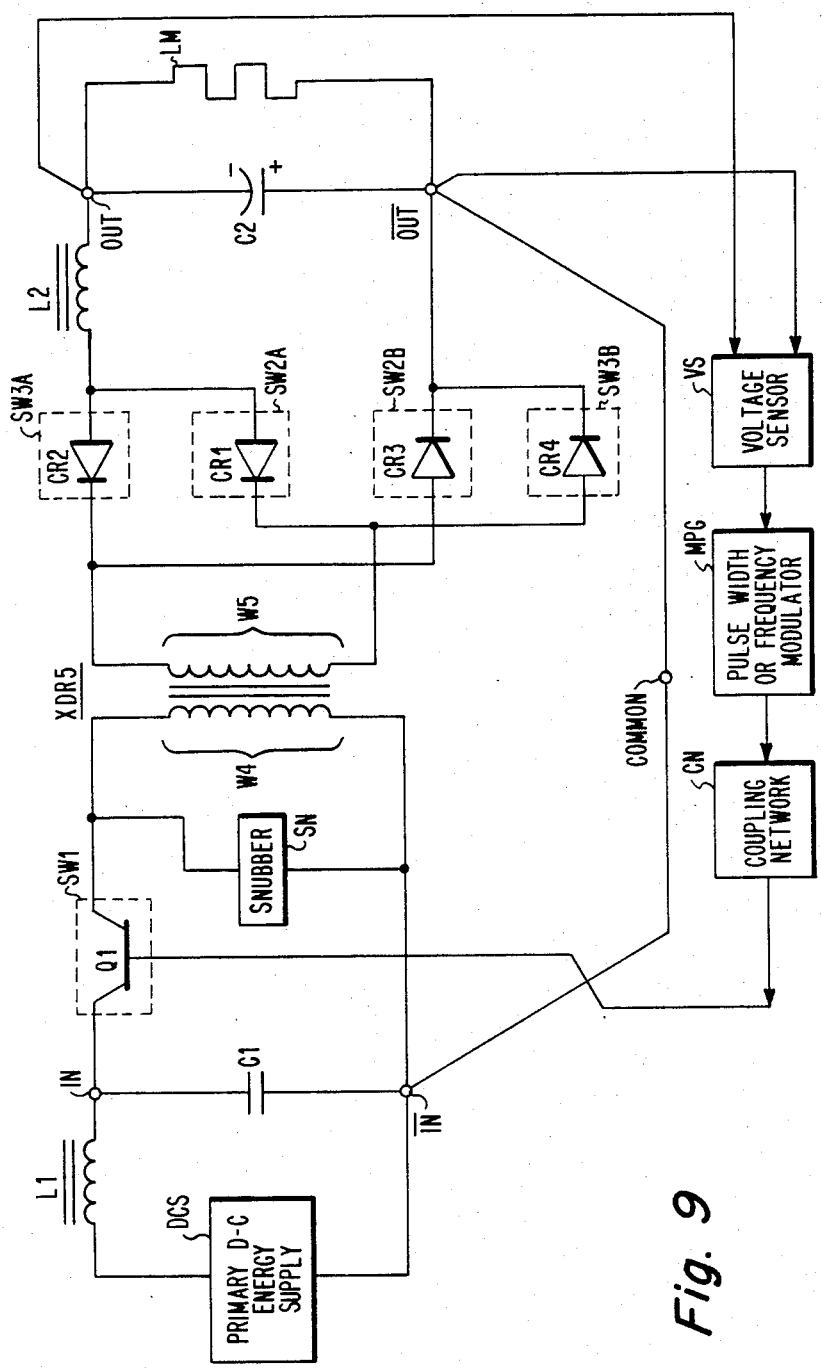
Figure 10:
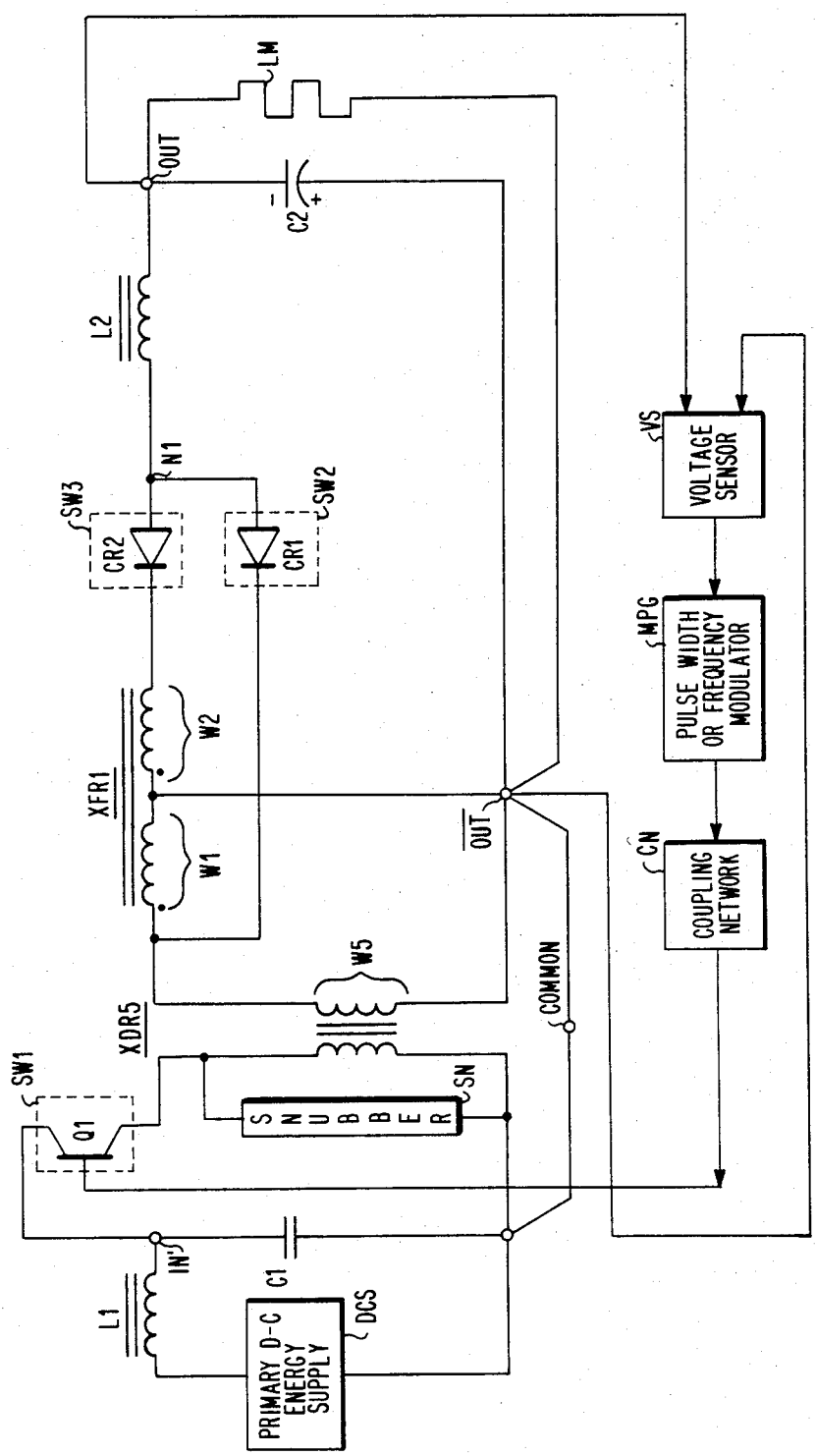
Figure 12:
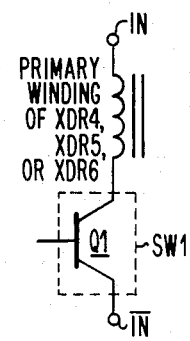
Figure 13:
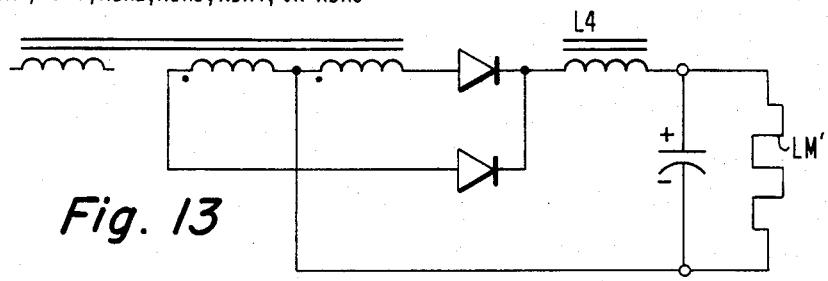
Figure 14:
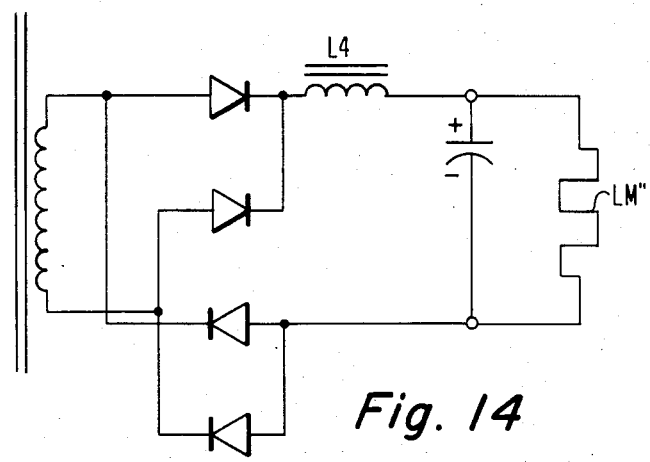

FIG. 12 is a schematic diagram showing a modification that can be made to the switching converters of FIGS. 8, 9 and 10, generating other embodiments of the inventions comprised within these figures; and FIGS. 13 and 14 are schematic diagrams showing how further indirectly regulated output voltage can be obtained from the switching converters in the earlier Figures of the drawing, in extension of the inventive teaching.

Figure 1:
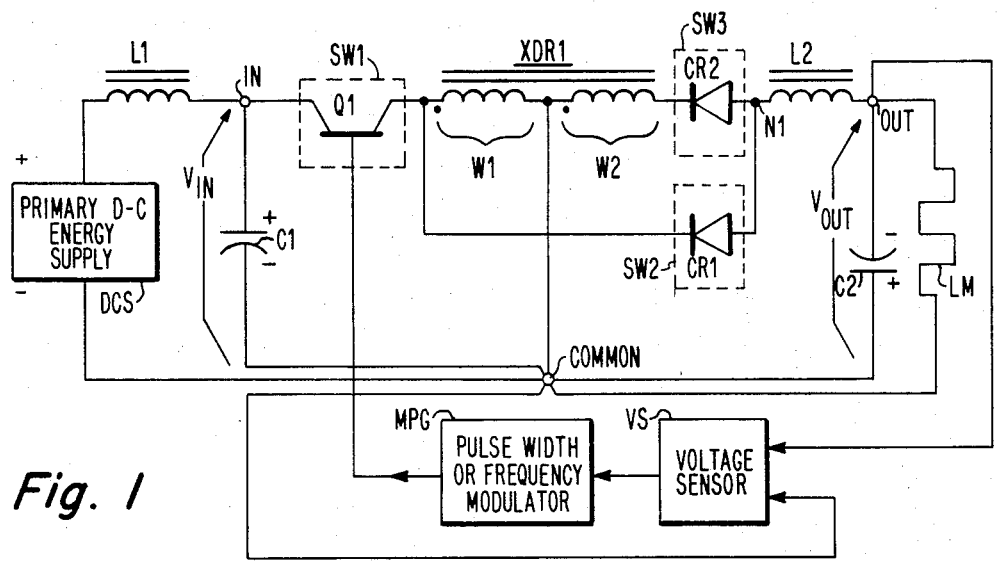
FIG. 1 is a schematic diagram of a buck-boost type of switching converter embodying the invention and providing switched regulation of its output voltage.

In the FIG. 1 switching converter the primary d-c energy supply DCS applies a direct voltage between the terminals COMMON and IN. While this voltage can be applied directly between these terminals, to maintain more constant loading on the supply DCS it is customary to apply this voltage via a low-pass smoothing filter comprising choke L1 and smoothing capacitor C1, as shown.

Flyback transformer XDR1 can take a variety of forms. It may simply comprise a tapped inductor where the windings W1 and W2, in 1:1 turns ratio, are portions of a continuous winding. It is, however, preferable from the point of view of obtaining the close coupling desired between windings W1 and W2, to use a tapped inductor where these windings are bifilar wound. XDR1 may also be provided by a transformer where W1 and W2 are its primary winding and secondary winding, respectively. In any case, the magnetic core structure associated with windings W1 and W2 should not saturate appreciably when direct current flows in winding W1, so this current flow is limited in order not to damage transistor Q1 or an alternatively used semiconductor device in switch means SW1.

A switch means SW1 recurrently connects the dotted end of winding W1, the undotted end of which winding connects to terminal COMMON, to terminal IN to receive the input voltage. When this connection is made, current flows through winding W1 to build up an electromagnetic field surrounding it. When switch means SW1 is non-conductive, this field begins to collapse, waning in strength as the self-inductance of winding W1 operates to maintain the current flow through itself. Switch means SW2 is rendered conductive at times switch means SW1 is non-conductive and then connects the dotted end of winding W1 via inductor L2 to the switching converter output terminal OUT. This permits a continuing flow of current in winding W1 to load means LM which causes a flyback voltage, negative respective to the voltage at terminal COMMON, to appear at the dotted end of winding W1. This flyback voltage is of an amplitude respective to the positive input voltage at terminal IN such that the time average of voltage across winding W1 is essentially zero. This is because the impedance of winding W1 is negligible at d-c, so an appreciable direct potential drop cannot be sustained across it. In other words, the positive input voltage at terminal IN multiplied by the length of time switch means SW1 is conductive should equal the flyback voltage multiplied by the length of time switch means SW1 is non-conductive. This flyback voltage supports the flow of current through an inductance L1 to the parallel connection of load means LM and a smoothing capacitor C2 during the time switch means SW1 is non-conductive. This current is delivered from the flyback energy stored in the self-inductance of winding W1 when SW1 was conductive, now released as the field surrounding this winding collapses responsive to SW1 being non-conductive. That portion of this current not flowing to load means LM, if such portion there be, charges capacitor C2 to increase the negative voltage between terminals COMMON and OUT, between which terminals C2 connects. The foregoing operation is similar to that of the conventional buck-boost type of switching converter.

In a conventional buck-boost converter, there is no continuing supply of current to load means LM during the times switch means SW2 is non-conductive, except as provided by discharge of smoothing capacitor C2, so C2 has to have a relatively large capacitance in order to keep output voltge ripple smaller than a prescribed value.

In the switching converter of FIG. 1, however, when switch means SW1 and SW2 are respectively conductive and nonconductive, switch means SW3 is made conductive and current flows through it to load means LM. The input voltage $V_{IN}$, appearing between terminal COMMON and IN and being applied across winding W1 owing to the conduction of switch means SW1, is transformed by the ratio of the number $N_2$ of turns in winding W2 to the number $N_1$ of turns in winding W1 to appear across winding W2. With switching means SW3 conductive, this voltage $(N_2/N_1)V_{IN}$ supports a continuing flow of current through inductance L1 to the parallel connection of load means LM and smoothing capacitor C2. So, C2 does not have to supply all the load current during times between flyback intervals, but is used only for filling in the ripple current; consequently, for keeping output voltage ripple smaller than any presribed value, C2 can be reduced in size as compared to the storage capacitor used in a conventional buck-boost converter. Where variations in output voltage $V_{OUT}$ between terminals COMMON and OUT are not of concern (e.g., in developing a transformed-down unidirectional voltage for supplying the heaters of a vacuum tube), C2 can be dispensed with and L2 replaced by direct connection of N1 to terminal OUT.

As shown in the Figures switch means SW2 and SW3 most simply comprise current rectifiers CR1 and CR2, respectively, conducting responsive to voltages across windings W1 and W2 of the converter transformer being of such polarities as to condition one or the other of the current rectifiers for conduction. Alternatively, SW2 and SW3 can be provided by the principal conduction paths of transistors commutated out-of-phase and in-phase respectively with the transistor Q1, the principal conduction path of which is shown providing switch means SW1. Transistor Q1 is shown as a bipolar transistor and may be a NPN type with collector at terminal IN and with emitter connected to winding W1; alternatively, it may be a PNP type with emitter at terminal IN and with collector connected to winding W1. Bipolar transistor Q1 may be replaced by a field effect transistor or gate-turn-off controlled rectifier, of course.

Similar to a usual practice with conventional buck-boost converters, switching regulation of the output voltage appearing between the terminals OUT and COMMON is provided by sensing that voltage as done by voltage sensor VS in the FIG. 1 switching converter and modulating the width or frequency of pulses generated by a pulse generator such as modulator MPG in the FIG. 1 switching converter. The voltage regulation arrangement is unusual, however, in that the amplitude of directly transformed $V_{IN}$ applied to node N1 when SW3 is conductive is not affected by the regulation; only the flyback voltage component applied to node N1 when SW2 is conductive is changed in order to regulate $V_{OUT}$ between terminals COMMON and OUT.

The ratio $N_2/N_1$ of the turns in windings W2 and W1 is preferably chosen to reduce the output voltage ripple for the nominal duty factor of switch means SW1. The voltage across winding W2, when switch means SW1 and SW3 are conductive and switch means SW2 is not, is $(N_2/N_1)V_{IN}$ as noted before, no matter what the duty factor of switch means SW1 is. The flyback voltage across winding W1 is $V_{IN}(t_{OFF}/t_{ON})$, where $t_{ON}$ is the time switch means SW1 is conductive each cycle and $t_{OFF}$ is the time switch means SW1 is non-conductive each cycle. Since $t_{OFF}/t_{ON}$ will vary as $V_{OUT}$ is regulated, the flyback voltage varies. But $N_2/N_1$ is preferably chosen such that $(N_2/N_1)V_{IN}$ equals the nominal value of $V_{IN}$ ($t_{OFF}/t_{IN}$)—i.e., $N_2/N_1$ is preferably chosen equal to $t_{OFF}/t_{ON}$. Duty factor equals $t_{ON}/(t_{ON}+t_{OFF})$, so the preferred value of $N_1/N_2$ is the reciprocal of duty factor, quantity, less unity. Under these conditions the voltage between terminal COMMON and node N1 has substantially constant value to which C2 is charged, assuming inductance L2 to have negligible resistance; and after C2 is charged converted current flow is essentially all to the load means LM. The inductance L2 permits the voltage at node N1 to exhibit alternating variations from the voltage at terminal OUT, so that this voltage is determined by conditions in the circuitry to the left of node N1 in FIG. 1.

If the duty factor increases from nominal value, the flyback component of node N1 voltage will increase relative to the conventionally transformed component; C2 will charge during flyback and discharge during conventional transformation so there will be some output voltage ripple (inversely proportional to the capacitance of C2, assuming its admittance to be higher than that of load means LM). If the duty factor decreases from nominal value, the flyback component of node N1 voltage will decrease relative to the conventionally transformed component; C2 will discharge during flyback and charge during conventional transformation, so there will be some output voltage ripple for this condition too. These output voltage ripples are smaller than in a conventional switching dc-to-dc converter, however, because the constant supply of current to node N1 from flyback transformer XDR 1 substantially lessens the degree to which the smoothing capacitor C2 is discharged during the conversion cycle.

If one can tolerate the loss in dc-to-dc conversion efficiency, inductor L2 can be replaced by a filter element which is primarily resistive. The voltage sensor VS can be a resistive voltage divider, for example; and the modulator MPG can be built around the SG3524 regulating pulse width modulator integrated circuit manufactured by Texas Instruments of Dallas, Tex., as one familiar with the art of switching converter design will immediately appreciate. To keep the turns ratio $N_2/N_1$ unity, so the flyback transformer windings can be more easily made tightly coupled, the nominal duty factor for SW1 conduction can be chosen to be 50%. In any case, this percentage is reduced to prevent increase in the input voltage applied between terminals COMMON and OUT causing the output voltage to exceed its prescribed value, or increased to prevent decrease in the input voltage causing the output voltage to be less than its prescribed value. When output voltage need not be regulated, the conduction of switch means SW1 can be controlled by other means, such as an astable multivibrator supplying a rectangular wave to switch the base of transistor Q1. Arrangements are also possible where, rather than the voltage between terminals COMMON and OUT being regulated and controlling the duty cycle of Q1 conduction, another flyback voltage taken from the windings W1 and W2 of XDR1 or from a further tertiary winding may be regulated and to this end control the conduction of Q1.

Choosing the ratio $N_2/N_1$ equal to $t_{OFF}/t_{ON}$ means that the output voltage $V_{OUT}$ will essentially equal input voltage $V_{IN}$ times $N_2/N_1$. Output voltages smaller than $V_{IN}(N_2/N_1)$ can be obtained by the modification shown in FIG. 2 wherein winding W1 is made a portion of a larger winding W3 across which $V_{IN}$ is selectively applied by switch means SW1; autotransformer action in winding W3 accomplishes the desired voltage step-down. Output voltages larger than $V_{IN}(N_2/N_1)$ can be obtained by the modification of FIG. 1 converter shown in FIG. 3 wherein winding W1 is replaced by a tapped winding W1', switch means SW1 selectively applies $V_{IN}$ to a portion of winding W1', and autotransformer action in winding W1' accomplishes the desired voltage step up.

The buck-boost converter circuits described above develop output voltages opposite in polarity to their input voltages. These circuits can be reconnected as boost converter circuits to develop output voltages of the same polarity as their input voltages, while continuing to use the inventive principle of transformer coupling the current used to store energy in the flyback winding to another winding; so that a continuous flow of output current can be obtained by combining the transformed and flyback currents from the two windings.

Figure 4:
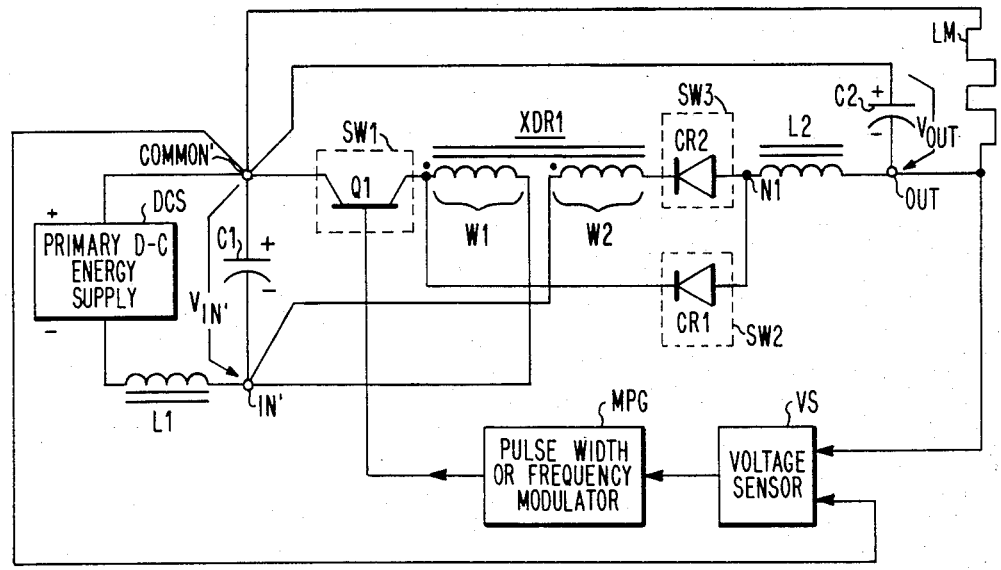
FIG. 4 is a schematic diagram of a boost type of switching converter embodying the invention and providing switched regulation of its output voltage.

FIG. 4 shows such reconnection of the FIG. 1 circuit. Terminals IN and COMMON of FIG. 1 become terminals COMMON' and IN' of FIG. 4; and output voltage $V_{OUT}$ at terminal OUT is referred to terminal IN' of FIG. 4. The end of the series connection of winding W2 and switch means SW3 which is remote from N1 connects to terminal IN'. There is a reversal of the order in which primary d-c energy supply DCS and choke L1 are arranged in their series connection, so that the positive pole of DCS connects directly to terminal COMMON'. The plate of the capacitor C2 remote from terminal OUT, and the end of load means LM remote from terminal OUT both connect to terminal COMMON' in FIG. 4 as opposed to terminal COMMON in FIG. 1.

Figure 5:
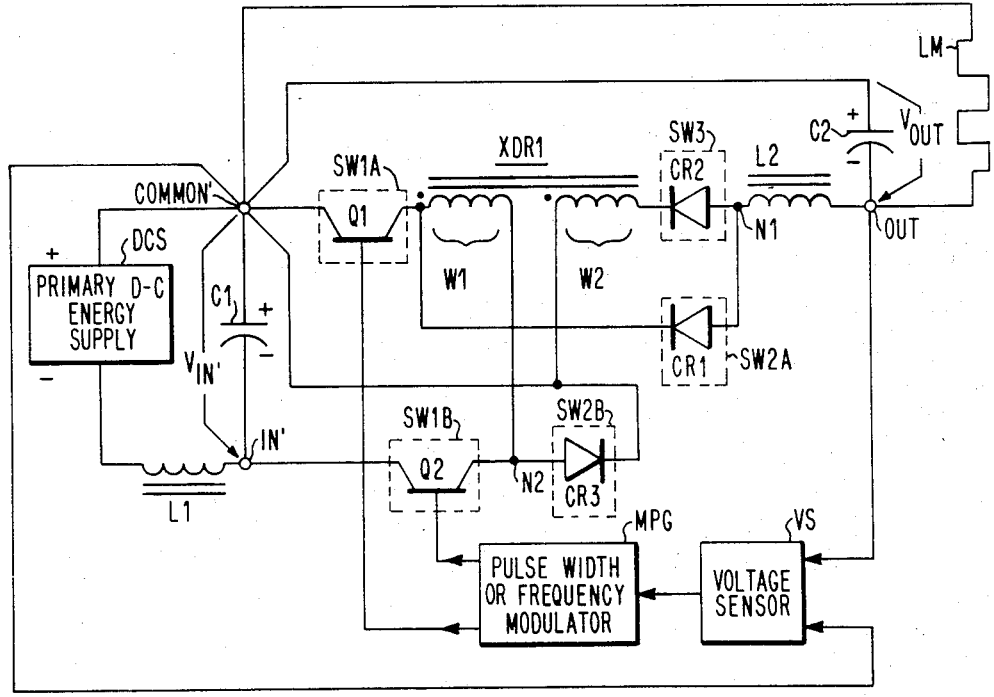
FIG. 5 is a schematic diagram of another buck-boost type of switching converter embodying a related invention and providing switched regulation of its output voltage.

FIG. 5 shows a buck-boost converter that has input and output voltages of the same polarity, but requires somewhat more complex switch means than the FIG. 1 and 4 converters. Responsive to pulses from pulse modulator MPG, switch means SW1 and SW2 (e.g., as may be provided by bipolar transistor Q1 and Q2) are rendered simultaneously conductive to connect winding W1 between terminals COMMON' and IN' to receive $V_{IN}$. As in the FIGS. 1 and 4 converters, this voltage causes a transformed voltage to appear across winding W2 to support a current flow through a conductive switch means SW3 (e.g., as may be provided by a current rectifier CR2) and through inductor L2 to the parallel connection of C2 and load means LM. During this time switch means SW2A and SW2B (e.g., as may be provided by current rectifiers CR1 and CR3) are non-conductive, so winding W1 is disconnected from the converter output circuit. The current flow through switch means SW1 and winding W1 has to equal to the current flow from winding W2 multiplied by the turns ratio $N_2/N_1$, as is typical of conventional transformation.

During the intervals between pulses from pulse modulator MPG, switch means SW1 and SW2 are non-conductive, disconnecting winding W1 from the converter input circuit. With winding W1 no longer supplied current, the electromagnetic field surrounding it no longer builds up, but starts to collapse; and this collapse induces a flyback voltage across winding W1 and a voltage across winding W2 of opposite polarity to that induced while the field was being built up. Switch means SW3 is rendered non-conductive during this flybck interval to disconnect winding W2 from the converter output circuit; this may be done responsive to the reversal of the polarity of the voltage induced across winding W2, as is the case when switch means SW3 comprises current rectifier CR1, as shown. During this flyback interval, winding W1 is connected to the converter output circuit to supply current to load means LM; this connection is made by a pair of switch means SW2A and SW2B conducting to connect the dotted and undotted ends of winding W1 to terminal COMMON' and to node N1 respectively; this may be done responsive to the reversal of the voltage across winding W1, as is the case where switch means SW2A and SW2B respectively comprise current rectifier CR2 and current rectifier CR3, as shown. The respective durations of the build up and of the collapse of the electromagnetic field surrounding windings W1 and W2 is responsive to the conduction and non-conduction of switch means SW1A and SW1B. The output voltage between terminals COMMON' and OUT is sensed by voltage sensor VS and used to control the timing of the pulses from modulator MPG that render SW1A and SW1B conductive, to close the feedback loop which regulates the output voltage $V_{OUT}$ between terminals COMMON' and OUT.

Figure 2:
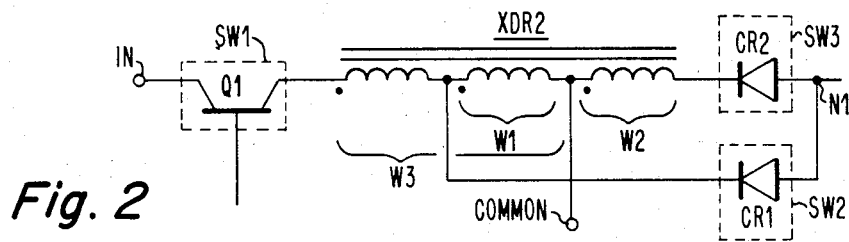
FIGS. 2 and 3 are schematic diagrams of modifications that can be made to the FIG. 1 switching converter resulting in switching converters with different scaling factors between input and output voltages, each of which also embodies the invention.
Figure 3:
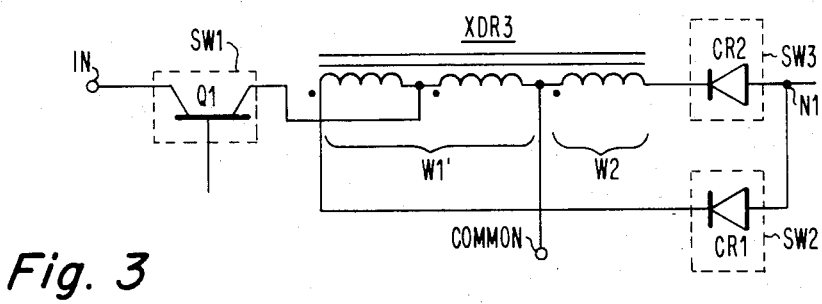
Figure 6:
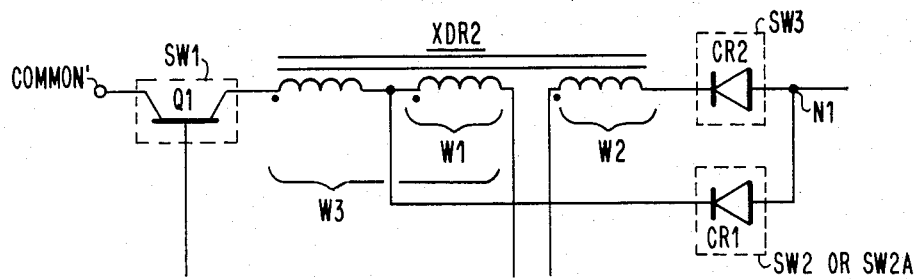
FIGS. 6 and 7 are schematic diagrams of modifications that can be made to the FIG. 4 or FIG. 5 switching converter resulting in switching converters with different scaling factors between input and output voltages, generating other embodiments of the inventions comprised within FIGS. 4 and 5.
Figure 7:
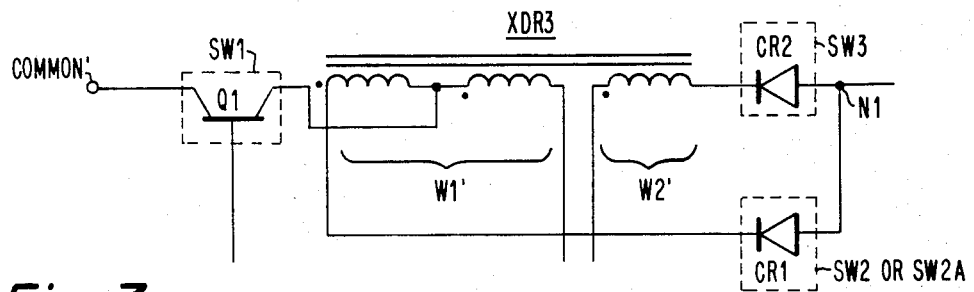

FIGS. 6 and 7 show the modifications that can be made to the FIG. 4 or 5 circuit analogous to the ones FIGS. 2 and 3 show can be made to the FIG. 1 circuit.

In the embodiments of the invention thus far described, the flybck transformer is of a sort that can be provided by a tapped inductor, and this has introduced the restriction that the input and output voltages $V_{IN}$ and $V_{OUT}$ are referred to the same direct potential (at terminal COMMON or COMMON'). This restriction can be overcome when windings W1 and W2 are made secondary windings of a flyback transformer having a separate primary winding to which $V_{IN}$ is selectively applied by conduction of switch means SW1.

FIG. 8 illustrates this possibility, flyback transformer XDR4 having windings W1 and W2 as secondary windings and having a winding W4 as its primary winding. The input voltage $V_{IN\text{-}\overline{IN}}$ appearing between converter input terminals $\overline{IN}$ and IN is applied across winding W4 at such times as switch means SW1 is conductive, to cause unidirectional current flow through winding W4 that builds up an electromagnetic field surrounding windings W1 and W2 as well as winding W4. This voltge is tranformed by normal transformer action to appear across winding W2, switch means SW3 being conductive to permit current to flow to load means LM and to C2 to adjust its charge and maintain a negative output voltage $V_{OUT\text{-}\overline{OUT}}$ between the output terminals $\overline{OUT}$ and OUT between which load means LM and C2 are connected. During the portion of the operating cycle in which switch means SW1 is non-conductive, the current flow through winding W4 which supported the electromagnetic field surrounding windings W4, W1 and W2 is interrupted. So, the field collapses, waning in strength to induce flyback voltage across winding W1. Switch means SW2 is conductive to supply current to load means LM and to C2 to adjust its charge and maintain the negative output voltage $V_{OUT\text{-}\overline{OUT}}$ between the output terminals $\overline{OUT}$ and OUT.

The tendency for current to be generated in winding W4 during this time switch means SW1 is open, owing to the collapse of the field surrounding it and to its self-inductance, generates a flyback voltage across the winding. As in conventional practice, to prevent damage occurring during flyback to a semiconductor device such as Q1 in the switch means SW1, a snubber circuit SN is connected across the primary winding W4 of flyback transformer XDR4. Typically, this snubber circuit comprises a series connection of capacitor and resistance connected across winding W4. The snubber is designed for damping the flyback voltage with as little energy consumption as possible, so as not to adversely affect converter efficiency. As will be apparent to one skilled in the art of switching regulator design, the snubber circuit SN may connect the switched end of the winding W4 to another point in the circuit other than its unswitched end—e.g., to terminal IN. Where there is a terminal COMMON, as shown, to which the terminals IN and OUT both connect, it is possible using known techniques to connect a clamp between the unswitched end of winding W4 and node N1 or terminal OUT, so that the energy otherwise lost to the snubber circuitry may in substantial measure be converted to output current.

If the coupling network CN applying the output pulses from modulator MPG to Q1 to control its conduction be suitable, these connections of both terminals IN and OUT to a terminal COMMON can be dispensed with so $V_{OUT\text{-}\overline{OUT}}$ can be isolated from $V_{IN\text{-}\overline{IN}}$. By way of example, a suitable coupling network CN is a coupling transformer with primary winding, across which the modulated pulses from modulator MPG are applied, and with a secondary winding, transformed pulses from which are dc-restored and applied between the emitter and base electrodes of Q1. Thus, the restriction that converter input and output voltages be referred to the same direct potential is overcome.

It should also be noted that the respective polarities of $V_{IN\text{-}\overline{IN}}$ and $V_{OUT\text{-}\overline{OUT}}$ can be chosen to be the same or to be opposite, so long as the coupling network CN for coupling the pulse modulator output to the control input of switch means SW1 is suitably chosen—e.g., as specifically described in the previous paragraph—and so long as the controlled current path of a semiconductor device—e.g., the collector-emitter path of Q1—is correctly poled. Since winding W1 is no longer driven with the current used to build up the field surrounding the transductor windings, there is no longer a restriction against simultaneously reversing the polarity of current rectifiers CR1 and CR2 in order to reverse the polarity of $V_{OUT\text{-}\overline{OUT}}$. That is, the fact that winding W1 is no longer driven with the current used to build up the field surrounding the flyback transformer windings lessens the distinctions between the connections of the windings W1 and W2 sufficiently that either can carry out the direct current transformation function with the other carrying out the function of furnishing flyback current.

FIG. 9 shows that both functions can be carried out by the untapped secondary winding W5 of a flyback transformer having a primary winding W4 the same as that of flyback transformer XDR4 and W5 being essentially the same as one of the windings W1 and W2. Switch means SW2 is modified again to comprise two component switch means SW2A and SW2B for connecting respective ends of winding W5 to terminals $\overline{OUT}$ and OUT during the flyback intervals when switch means SW1 is non-conductive, and switch means SW3 is modified to comprise two component switch means SW3A and SW3B for reconnecting those respective ends of winding W5 to the opposite ones of terminals $\overline{OUT}$ and OUT during the times when switch means SW1 is conductive to connect winding W4 between terminals IN and $\overline{IN}$, so current flows through W4 to build up field surrounding the flyback transformer windings and thus store energy for flyback. Switch means SW2A, SW2B, SW3A and SW3B may simply consist of current rectifiers CR1, CR3, CR2 and CR4, respectively, as shown.

FIG. 10 shows how the FIG. 9 converter may be modified using a split-phase transformer XFR1, so that switch means SW2 and SW3 can each consist of a respective single current rectifier—CR1 and CR2, respectively. In both the FIGS. 9 and 10 configurations the design freedom of FIG. 8 respective to isolation of the input and output voltages $V_{IN\text{-}\overline{IN}}$ and $V_{OUT\text{-}\overline{OUT}}$ and to their relative polarities obtains.

Figure 11:
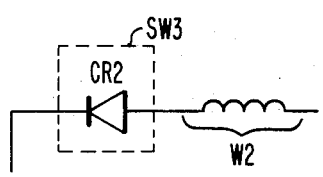
FIG. 11 is a schematic diagram showing a modification that can be made to any of the switching converters of FIGS. 1, 4, 5, 8 and 10, resulting in further embodiment of the inventions comprised within these figures.

FIG. 11 shows the series connection of winding W2 and current rectifier CR2 reversed in order as may be done in FIGS. 1, 4, 5, 8 and 10. FIG. 12 shows an alternative switch means SW1 connection that can be used in any of the FIGS. 8, 9, and 10 converters; and the series connection of winding W1 and current rectifier CR1 may be similarly reversed in the FIG. 8 converter.

As shown in FIG. 13, if XFR1, XDR1, XDR2, XDR3, XDR4, or XDR5 is modified to include at least one further pair of windings in 1:1 turns ratio with each other, they can be used to apply an indirectly regulated output voltage to a respective further load means LM'. Or, as shown in FIG. 14, XFR1, XDR1, XDR2, XDR3, XDR4, or XDR5 can be modified to include at least one further winding that is used to apply an indirectly regulated output voltage to a respective further load means LM. The smoothing capacitor and current rectifiers in either of the FIGS. 13 and 14 can be reversed to obtain oppositely poled voltage across the further load means. The inductor L4 may be replaced by direct connection, using the transformed self-inductance of primary windings instead.

In any of the converter configurations described, the output filter inductor and capacitor can be replaced by short and open circuit respectively if the presence of a-c ripple superimposed on the unidirectional output voltage and current can be tolerated.

What is claimed is:

1. A switching dc-to-dc converter for supplying a substantially continuous flow of output current, comprising:

first and second terminals for receiving therebetween the primary dc energy to be converted;

flyback transformer having a first winding and a second winding to which said first winding is continuously transformer coupled and providing the energy storage inductance needed for sustaining said substantially continuous flow of output current, said first and second windings having respective first and second ends with currents of opposite polarities tending to flow from their first ends responsive to waxing or waning of the strength of the electromagnetic field surrounding them, the first ends of said first and second windings being connected to said first terminal, said first winding having between its first end and a point along said first winding not necessarily its second end the same number of turns as said second winding has between its first and second ends;

first switch means, which connects during each time interval in a first series of time intervals, the second end of said first winding to said second terminal, for completing a path for input current flow through said winding to cause the waxing of the strength of an electromagnetic field for storing energy to be released by the waning of the strength of said electromagnetic field during a second series of time intervals interleaved with said first series of time intervals, during which second series of time intervals said path is not completed by said first switch means;

means for recovering flyback current flow during said second series of time intervals from said point along the first winding of said flyback transformer means;

means for providing, as said substantially continuous flow of output current during both said first and second series of time intervals, a combination of currents essentially consisting of the transformed input current flow induced in said second winding during said first series of time intervals and flyback current flow during said second series of time intervals;

a third terminal for passing said output current;

a capacitor connecting between said first and third terminals; and within said means for providing a combination of currents, a dc-conductive impedance element having a first end connected to said third terminal and having a second end, second switch means selectively connecting during each of the time intervals in said second series the second end of said d-c conductive impedance element and said point along said first winding, and third switch means selectively connecting during each of the time intervals in said first series the second ends of said dc-conductive element and said second winding.

2. A switching dc-to-dc converter as set forth in claim 1 wherein said first switch means comprises:

a semiconductor switching device having a principal current conduction path connected between said second terminal and the second end of said first winding and having a control electrode, and means applying pulses to the control electrode of said semiconductor switching device during said first series of time intervals for rendering the principal current conduction path of said semiconductor switching device conductive.

3. A switching dc-to-dc converter as set forth in claim 2 wherein said means applying pulses includes:

a pulse generator for supplying pulses with specified duration and specified repetition rate, at least one of which specified characteristics is adjustable responsive to a control signal; and means sensing the departure of the potential between said first and third terminals from a prescribed value to generate said control signal, thereby to complete a degenerative feedback connection for regulating the potential between said first and third terminals to said prescribed value.

4. A switching dc-to-dc converter for supplying a substantially continuous flow of output current, comprising:

first and second terminals for receiving therebetween the primary dc energy to be converted;

flyback transformer means, having a first winding and a second winding to which said first winding is continuously transformer coupled, and providing the energy storage inductance needed for sustaining said substantially continuous flow of output current, said first and second windings having respective first and second ends with currents of opposite polarities tending to flow from their first ends responsive to waxing or waning of the strength of the electromagnetic field surrounding them, the first end of said first winding being connected to said first terminal, said first winding having between its first end and a point along said first winding not necessarily its second end the same number of turns as said second winding has between its first and second ends;

first switch means, which connects during each time interval in a first series of time intervals the second end of said first winding to said second terminal, for completing a path for input current flow through said first winding to cause the waxing of the strength of an electromagnetic field for storing energy to be released by the waning of said electromagnetic field during a second series of time intervals interleaved with said first series of time intervals, during which second series of time intervals said path is not completed by said first switch means;

means for recovering flyback current flow during said second series of time intervals from said point along the first winding of said flyback transformer means;

means for providing, as said substantially continuous flow of output current during both said first and second series of time intervals, a combination of currents essentially consisting of the transformed input current flow induced in said second winding during said first series of time intervals and flyback current flow during said second series of time intervals;

a third terminal for passing said output current;

a capacitor connecting between said first and third terminals; and within said means for providing a combination of currents, a dc-conductive impedance element having a first end connected to said third terminal and having a second end to which the second end of said second winding connects, second switch means selectively connecting during each of the time intervals in said second series the second end of said dc-conductive impedance element and said point along said first winding; and third switch means selectively connecting during each of the time intervals in said first series the first end of said second winding to said first terminal.

5. A switching dc-to-dc converter as set forth in claim 4 wherein said first switch means comprises:

a semiconductor switching device having a principal current conduction path connected between said second terminal and the second end of said first winding and having a control electrode, and means applying pulses to the control electrode of said semiconductor switching device during said first series of time intervals for rendering the principal curent conduction path of said semiconductor switching device conductive.

6. A switching dc-to-dc converter as set forth in claim 5 wherein said means applying pulses includes:

a pulse generator for supplying pulses with specified duration and specified repetition rate, at least one of which specified characteristics is adjustable responsive to a control signal; and means sensing the departure of the potential between said first and third terminals from a prescribed value to generate said control signal, thereby to complete a degenerative feedback connection for regulating the potential between said first and third terminals to said prescribed value.

7. A switching dc-to-dc converter for supplying a substantially continuous flow of output current, comprising:

first and second terminals for receiving therebetween the primary dc energy to be converted;

flyback transformer means having a first winding and a second winding to which said first winding is continuously transformer coupled, and providing the energy storage impedance needed for sustaining said sustantially continuous flow of output current, said first and second windings having respective first and second ends with currents of opposite polarities tending to flow from their first ends responsive to waxing or waning of the strength of the electromagnetic field surrounding them, the first ends of said first and second windings being connected to said second terminal, said first winding having between its first end and a point along said first winding not necessarily its second end the same number of turns as said second winding has between its first and second ends;

first switch means, which connects during each time interval in a first series of time intervals the second end of said first winding to said second terminal, for completing a path for input current flow through said first winding to cause the waxing of the strength of an electromagnetic field for storing energy to be released by the waning of said electromagnetic field during a second series of time intervals interleaved with said first series of time intervals, during which second series of time intervals said path is not completed by said first switch means;

means for recovering flyback current flow during second series of time intervals from said point along the first winding of said flyback transformer means;

means for providing, as said substantially continuous flow of output current during both said first and second series of time intervals, a combination of currents essentially consisting of the transformed input current flow induced in said second winding during said first series of time intervals and flyback current flow during said second series of time intervals;

a third terminal for passing said output current;

a capacitor connecting between said first and third terminals; and within said means for providing a combination of currents, a dc-conductive impedance element having a first end connected to said third terminal and having a second end, second switch means selectively connecting during each of the time intervals in said second series the second end of said dc-conductive inpedance element and said point along said first winding; and third switch means selectively connecting during each of the time intervals in said first series the second ends of said d-c conductive element and said second winding.

8. A switching dc-to-dc converter as set forth in claim 7 wherein said first switch means comprises:

a semiconductor switching device having a principal current conduction path connected between said first terminal and the second end of said first winding and having a control electrode, and means applying pulses to the control electrode of said semiconductor switching device during said first series of time intervals for rendering the principal current conduction path of said semiconductor switching device conductive.

9. A switching dc-to-dc converter as set forth in claim 8 wherein said means applying pulses includes:

a pulse generator for supplying pulses with specified duration and specified repetition rate, at least one of which specified characteristics is adjustable responsive to a control signal; and means sensing the departure of the potential between said first and third terminals from a prescribed value to generate said control signal, thereby to complete a degenerative feedback connection for regulating the potential between said first and third terminals to said prescribed value.

10. A switching dc-to-dc converter for supplying a substantially continuous flow of output current, comprising:

first and second terminals for receiving therebetween the primary dc energy to be converted;

flyback transformer means, having a first winding and a second winding to which said first winding is continuously transformer coupled, and providing the energy storage inductance needed for sustaining said substantially continuous flow of output current, said first and second windings having respective first and second ends with currents of opposite polarities tending to flow from their first ends responsive to waxing or waning of the strength of the electromagnetic field surrounding them, the first end of said first winding being connected to said second terminal, said first winding having between its first end and a point along said first winding not necessarily its second end the same number of turns as said second winding has between its first and second ends;

first switch means, which connects during each time interval in a first series of time intervals the second end of said first winding to said second terminal, for completing a path for input current flow through said first winding to cause the waxing of the strength of an electromagnetic field for storing energy to be released by the waning of said electromagnetic field during a second series of time intervals interleaved with said first series of time intervals, during which second series of time intervals said path is not completed by said first switch means;

means for recovering flyback current flow during said second series of time intervals from said point along the first winding of said flyback transformer means;

a third terminal for passing said output currents a capacitor connecting between said first and third terminals; and within said means for providing a combination of currents, a dc-conductive impedance element having a first end connected to said third terminal and having a second end to which the second end of said second winding connects, second switch means selectively connecting during each of the time intervals in said second series the second end of said dc-conductive inpedance element and said point along said first winding and;

third switch means selectively connecting during each of the time intervals in said first series the first end of said second winding to said second terminal.

11. A switching dc-to-dc converter as set forth in claim 10 wherein said first switch means comprises:

a semiconductor switching device having a principal current conduction path connected between said first terminal and the second end of said first winding and having a control electrode, and means supplying pulses to the control electrode of said semiconductor switching device during said first series of time intervals for rendering the principal current conduction path of said semiconductor switching device conductive.

12. A switching dc-to-dc converter as set forth in claim 11 wherein said means applying pulses includes:

a pulse generator for supplying pulses with specified duration and specified repetition rate, at least one of which specified characteristics is adjustable responsive to a control signal; and means sensing the departure of the potential between said first and third terminals from a prescribed value to generate said control signal, thereby to complete a degenerative feedback connection for regulating the potential between said first and third terminals to said prescribed value.

* * * * *